(12) United States Patent
Chen et al.

(10) Patent No.: US 11,797,594 B2
(45) Date of Patent: Oct. 24, 2023

(54) SYSTEMS AND METHODS FOR GENERATING LABELED SHORT TEXT SEQUENCES

(71) Applicant: Verint Americas Inc., Alpharetta, GA (US)

(72) Inventors: Xinyu Chen, Spokane, WA (US); Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 427 days.

(21) Appl. No.: 17/093,722

(22) Filed: Nov. 10, 2020

(65) Prior Publication Data

US 2021/0173862 A1 Jun. 10, 2021

Related U.S. Application Data

(60) Provisional application No. 62/945,390, filed on Dec. 9, 2019.

(51) Int. Cl.
  *G06F 16/35* (2019.01)
  *G06F 16/36* (2019.01)
  *G06F 40/289* (2020.01)

(52) U.S. Cl.
  CPC .......... *G06F 16/355* (2019.01); *G06F 16/367* (2019.01); *G06F 40/289* (2020.01)

(58) Field of Classification Search
  CPC .... G06F 16/355; G06F 16/367; G06F 40/289; G06F 40/30
  See application file for complete search history.

(56) References Cited

U.S. PATENT DOCUMENTS

| | | | |
|---|---|---|---|
| 11,556,572 B2* | 1/2023 | Morris | G06F 16/338 |
| 2015/0317301 A1* | 11/2015 | Liang | G06F 16/3344 |
| | | | 704/9 |
| 2021/0286948 A1* | 9/2021 | Kruengkrai | G06N 5/01 |

FOREIGN PATENT DOCUMENTS

CN 107451187 12/2017

OTHER PUBLICATIONS

Bizer, C., et al., "DBpedia—A crystallization point for the Web of Data," Web Semantics: Science, Services and Agents on the World Wide Web, vol. 7, No. 3, 2009, pp. 154-165.

(Continued)

*Primary Examiner* — Linda Wong
(74) *Attorney, Agent, or Firm* — Meunier Carlin & Curfman LLC

(57) ABSTRACT

A set of documents related to a particular topic, industry, or entity are received. Sentences are extract from each document. The sentences are grouped into tuples of one, two, or three consecutive sentences (i.e., short text sequences). The sentence tuples are clustered based on vector representations of the sentences. For each cluster, a set of tuples that best represents or best fits the cluster is selected. These sentence tuples are fed to an ontology to determine ontological entities associated with each tuple. These determined ontological entities are associated with the clusters corresponding to each tuple. The sentence tuples associated with each cluster are labeled based on the ontological entities associated with the cluster. The labeled sentence tuples may then be used for a variety of purposes such as training a model to determine the topic of short text sequences.

17 Claims, 4 Drawing Sheets

(56) References Cited

OTHER PUBLICATIONS

Dent, K., et al., "Through the Twitter Glass: Detecting Questions in Micro-Text," Workshops at the 25th AAAI Conference on Artificial Intelligence, arXiv:2006.07732v1, 2011, pp. 8-13.

Devlin, J., et al., "Bert: Pre-training of Deep Bidirectional Transformers for Language Understanding," arXiv:1810.04805, 2018, 16 pages.

Greene, D., et al., "Producing Accurate Interpretable Clusters from High-Dimensional Data," Proceedings of the 9th European Conference on Machine Learning and Principles and Practice of Knowledge Discovery in Databases (ECMLPKDD'05), 2005, pp. 486-494.

Greene, D., et al., "Practical Solutions to the Problem of Diagonal Dominance in Kernel Document Clustering," Proceedings of the 23rd International Conference on Machine Learning, 2006, pp. 377-384.

Henderson, M., et al., "The Second Dialog State Tracking Challenge," Proceedings of the 15th Annual Meeting of the Special Interest Group on Discourse and Dialogue (SIGDIAL'14), 2014, pp. 263-272.

Lewis, D., et al., "RCV1: A New Benchmark Collection for Text Categorization Research," Journal of Machine Learning Research, 2004, vol. 5, pp. 361-397.

Lu, X., "Automatic analysis of syntactic complexity in second language writing," International Journal of Corpus Linguistics, vol. 15, No. 4, 2010, pp. 474-496.

Pennington, J., et al., GloVe: Global Vectors for Word Representation, Proceedings of the 2014 Conference on Empirical Methods in Natural Language Processing (EMNLP'14), 2014, pp. 1532-1543.

Peters, M., et al., "Deep contextualized word representations," Proceedings of the 2018 Conference of the North American Chapter of the Association for Computational Linguistics, vol. 1, arXiv:1802.05365, 2018, pp. 2227-2237.

Serban, I., et al., "A Survey of Available Corpora for Building Data-Driven Dialogue Systems," arXiv:1512.05742, 2015, 46 pages.

Shrestha, P., et al., "Clustering Short Text and Its Evaluation," International Conference on Intelligent Text Processing and Computational Linguistics, 2012, pp. 169-180.

Uthus, D., et al., "The Ubuntu Chat Corpus for Multiparticipant Chat Analysis," Analyzing Microtext: Papers from the 2013 AAAI Spring Symposium, 2013, pp. 99-102.

Wang, S., et al, "Beyond word2vec: Distance-graph Tensor Factorization for Word and Document Embeddings," Proceedings of the 28th International Conference on Information and Knowledge Management (CIKM'19), 2019, pp. 1041-1050.

Williams, J., et al., "The Dialog State Tracking Challenge," Proceedings of the SIGDIAL 2013 Conference, 2013, pp. 404-413.

International Search Report and Written Opinion, dated Feb. 3, 2021, received in connection with corresponding International Patent Application No. PCT/US2020/060086.

\* cited by examiner

100

SYSTEMS AND METHODS FOR GENERATING LABELED SHORT TEXT SEQUENCES

CROSS-REFERENCE TO RELATED APPLICATIONS

This application claims the benefit of U.S. provisional patent application No. 62/945,390, filed on Dec. 9, 2019, and entitled "Building A Micro-Text Corpus Without Human Interaction," the disclosure of which is expressly incorporated herein by reference in its entirety.

BACKGROUND

People are producing huge volume of short text sequences such as social media posts, question-answer dialogues, and retail website product descriptions. Classifying or clustering short text sequences is an important task for sentiment analysis, information extraction and outlier detections. However, classifying or clustering short text sequences is very challenging because short text sequences typically contain few words making computing the similarity of such sequences difficult.

SUMMARY

A set of documents related to a particular topic, industry, or entity are received. Sentences are extract from each document. The sentences are grouped into tuples of one, two, or three consecutive sentences (i.e., short text sequences). The sentence tuples are clustered based on vector representations of the sentences. For each cluster, a set of tuples that best represents or best fits the cluster is selected. These sentence tuples are fed to an ontology to determine ontological entities associated with each tuple. These determined ontological entities are associated with the clusters corresponding to each tuple. The sentence tuples associated with each cluster are labeled based on the ontological entities associated with the cluster. The labeled sentence tuples may then be used for a variety of purposes such as training a model to determine the topic of short text sequences.

As will be discussed further below, the embodiments described herein provide many advantages. First, the systems and method described herein are capable of generating large sets of labeled short text sequences without significant human input based only on a set of documents. In particular, no human reviewers are required to label any of the short text sequences. Second, by changing the subject matter or domain of the documents in the set of document, a different set of labeled short text sequences can be easily created. In this way models can be trained to classify short text sequences for a variety of industries or purposes simply by varying the documents initially used to extract the sentences.

In one embodiment, a method for automatically generating labeled short text sequences from a document corpus without a human reviewer is provided. The method includes: receiving a plurality of documents by a computing device; for each document of the plurality of documents, extracting a plurality of sentences from the document by the computing device; for each document of the plurality of documents, generating a plurality of short text sequences from the plurality of sentences extracted from the document by the computing device; assigning each of the plurality of short text sequences into one or more clusters of a plurality of clusters by the computing device; determining one or more topics for each cluster based on one or more of the short text sequences associated with the cluster by the computing device; and for each short text sequence, labeling the short text sequence using the one or more topics determined for the one or more clusters of the plurality of clusters that the short text sequence is assigned to by the computing device.

Embodiments may include some or all of the following features. Assigning each of the plurality of short text sequences into one or more clusters of the plurality of clusters may include: for each short text sequence, generating a vector representation of the short text sequence; and assigning each of the plurality of short text sequences into one or more clusters of the plurality of clusters based on the vector representations. Determining one or more topics for each cluster based on the short text sequences associated with the cluster may include: for each short text sequence, calculating the probability that the vector representation of the short text sequence belongs to each cluster; for each cluster, selecting a subset of the vector representations based on the calculated probabilities; for each cluster, using an ontology to determine ontological entities associated with the short text sequences corresponding to the vector representations in the selected subset of vector representations for the cluster by the computing device; and for each cluster, determining the one or more topics based on the determined ontological entities. The method may further include training a model using the labeled short text sequences. The method may further include: for each plurality of sentences: calculating a complexity for each sentence in the plurality of sentences; and removing sentences from the plurality of sentences with a calculated complexity that does not exceed a threshold. The threshold may be zero. Calculating the complexity for a sentence may include calculating a number of complex nominals for the sentence. Generating the plurality of short text sequences from the plurality of sentences extracted from the document may include generating a short text sequence from each sentence of the plurality of sentences. Generating the plurality of short text sequences from the plurality of sentences extracted from the document may include generating a short text sequence from each pair of consecutive sentences of the plurality of sentences. Generating the plurality of short text sequences from the plurality of sentences extracted from the document may include generating a short text sequence from each triplet of consecutive sentences of the plurality of sentences.

In one embodiment, a system for automatically generating labeled short text sequences from a document corpus without a human reviewer is provided. The system includes at least one computing device and a computer-readable medium. The computer-readable medium storing computer-executable instructions that when executed by the at least one computing device cause the at least one computing device to: for each document of the plurality of documents, extract a plurality of sentences from the document; for each document of the plurality of documents, generate a plurality of short text sequences from the plurality of sentences extracted from the document; assign each of the plurality of short text sequences into one or more clusters of a plurality of clusters; determine one or more topics for each cluster based on the short text sequences associated with the cluster; and for each short text sequence, label the short text sequence using the one or more topics determined for the one or more clusters of the plurality of clusters that the short text sequence is assigned to.

Embodiments may include some or all of the following features. Assigning each of the plurality of short text sequences into one or more clusters of the plurality of clusters may include: for each short text sequence, generating a vector representation of the short text sequence; and assigning each of the plurality of short text sequences into one or more clusters of the plurality of clusters based on the vector representations. Determining one or more topics for each cluster based on the short text sequences associated with the cluster may include: for each short text sequence, calculating the probability that the vector representation of the short text sequence belongs to each cluster; for each cluster, selecting a subset of the vector representations based on the calculated probabilities; for each cluster, using an ontology to determine ontological entities associated with the short text sequences corresponding to the vector representations in the selected subset of vector representations for the cluster; and for each cluster, determining the one or more topics based on the determined ontological entities. The system fay further include instructions that train a model using the labeled short text sequences. The instructions that when executed by the at least one computing device may cause the at least one computing device to: for each plurality of sentences: calculate a complexity for each sentence in the plurality of sentences; and remove sentences from the plurality of sentences with a calculated complexity that does not exceed a threshold. The threshold may be zero. Calculating the complexity for a sentence may include calculating a number of complex nominals for the sentence. Generating the plurality of short text sequences from the plurality of sentences extracted from the document may include generating a short text sequence from each sentence of the plurality of sentences. Generating the plurality of short text sequences from the plurality of sentences extracted from the document may include generating a short text sequence from each pair of consecutive sentences of the plurality of sentences.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
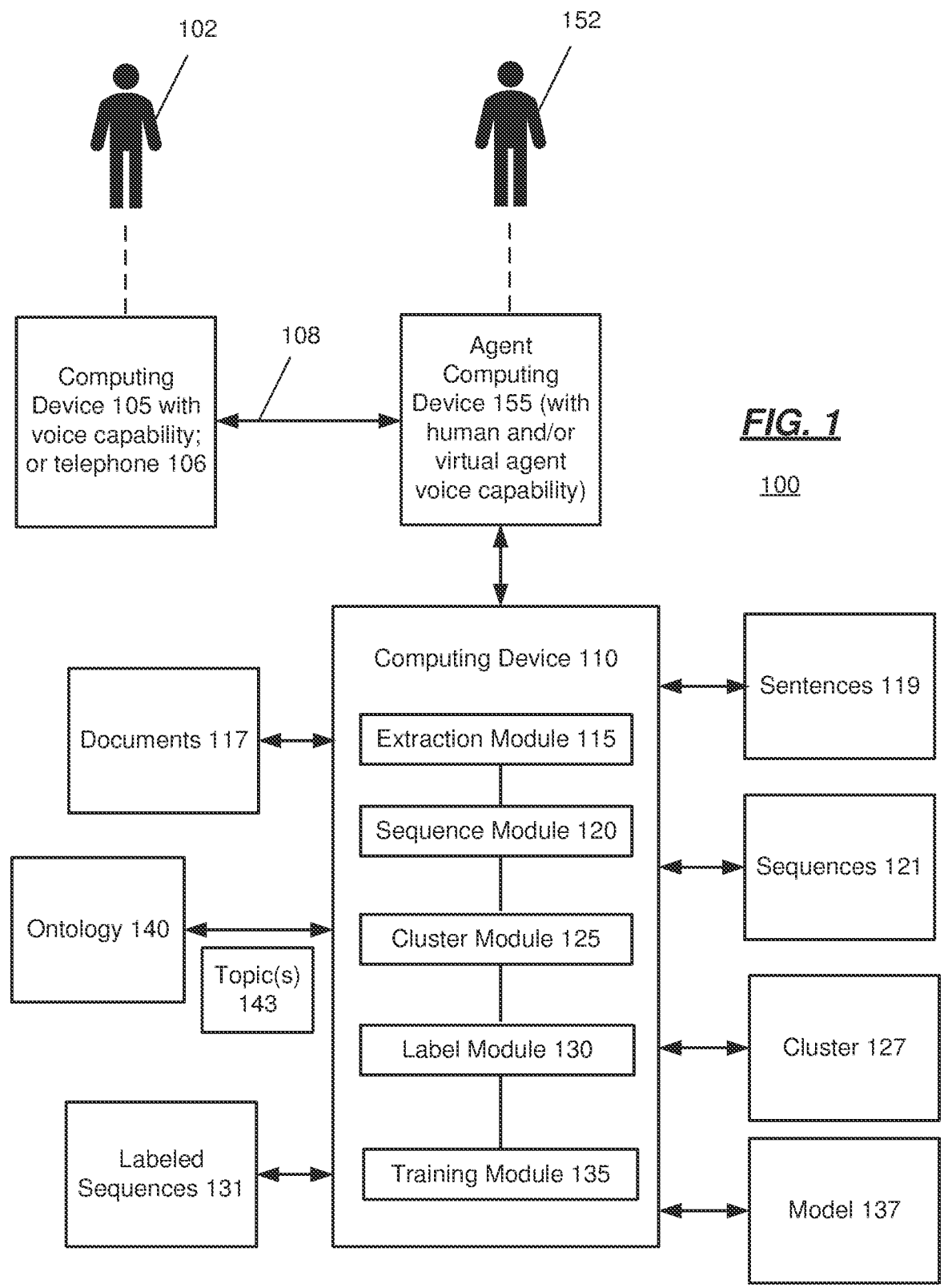
FIG. 1 is an illustration of an environment for generating labeled short text sequences.

FIG. 1 is an illustration of an environment 100 for generating labeled short text sequences (also referred to as micro text sequences). The environment 100 may be implemented by a call center or any other entity that receives or processes short text sequences. A customer 102 may use a computing device 105 (or a telephone 106) to initiate a call with an agent 152 associated with the environment 100. The agent 152 may receive the call via a channel 108 such as a VOIP line, POTS line, or a cellular channel. Any channel suitable for voice communication may be used.

The agent 152 may receive the call from the customer 102 on an agent computing device 155. The agent computing device 155 may be equipped with both human and virtual voice agent capabilities.

Besides the agent 152, the call may also be received (at the same time or later) by a computing device 110 associated with the call center environment 100. The computing device 110 may provide one or more call center services to the customer 102 such as interactive voice response services ("IVR") where the user may be presented with an automated system that may determine the optimal agent 152 to direct the call, may determine the identity of the customer 102, or may retrieve other information from the customer in an automated way.

Figure 4:
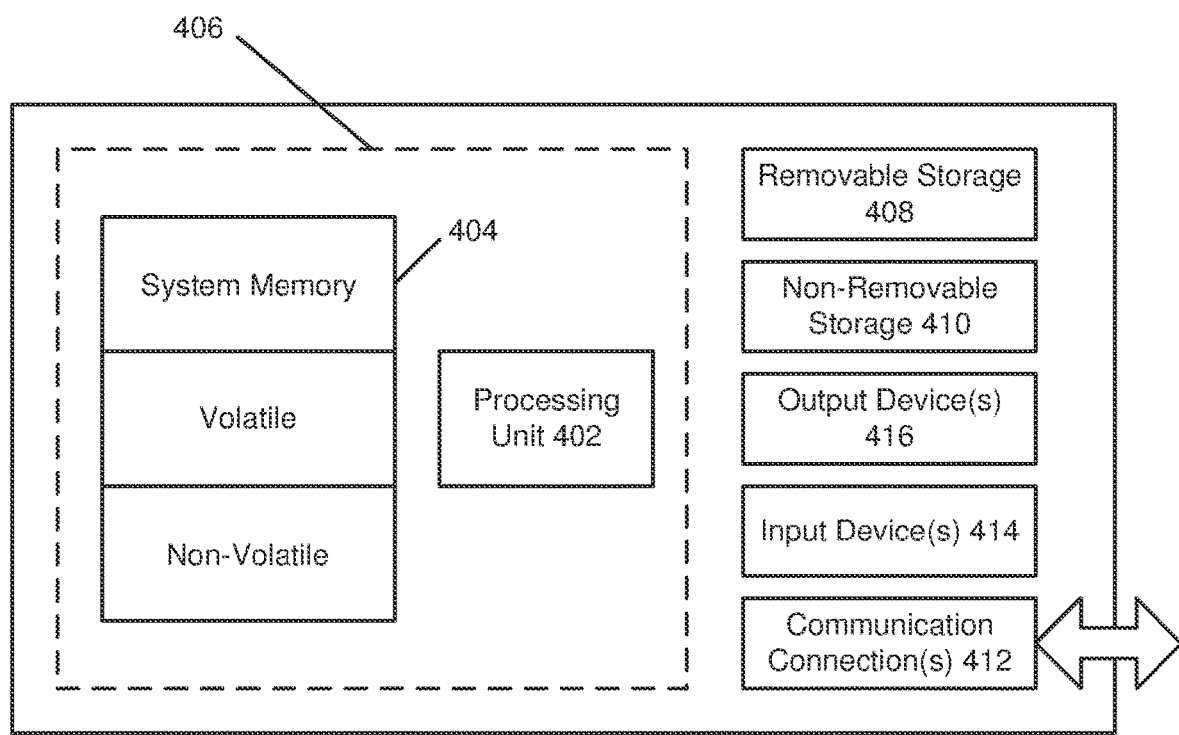
FIG. 4 shows an exemplary computing environment in which example embodiments and aspects may be implemented.

As may be appreciated, the computing device 105, agent computing device 155, and the computing device 110 may each be implemented by one or more general purpose computing devices such as the computing device 400 illustrated with respect to FIG. 4. Depending on the embodiment, the computing device 110 may be part of a device performing functions in a call center. Although the computing device 110 is described with respect to call centers, it is not limited to call centers and may be be used in an industry where short text sequences may be received or processed.

As used herein a short text sequence is one or more text sentences or phrases. Examples of short text sequences include SMS messages, chat messages, emails, or portions of call transcripts, and comments on a webpage or blog. Other types of text may be included. An entity such as a call center may receive numerous short text sequences from customers. For example, customers may use a chat function to communicate with an agent 152 about a recently purchased product or may send an email to an agent 152 asking for help with a return.

Because the length of short text sequences is small, it may be difficult for a call center or other entity to quickly determine the topic or purpose of a received short text sequence due to the lack of keywords or other phrases that may appear in larger text sequences. Furthermore, there is a general lack of training data that could be used to train a model to determine the topic of short text sequences.

In order to solve the problems described herein, the computing device 110 may include a plurality of modules directed to generating and labeling short text sequences. As illustrated, these modules include an an extraction module 115, a sequence module 120, a cluster module 125, a label module 130, and a training module 135. More or fewer modules may be supported. Depending on the embodiment, some or all of the modules may be implemented the same computing device 110, or by some combination of computing devices 110. In addition, some or all of the modules may be implemented by a cloud-based computing system.

The extraction module 115 may receive a set of documents 117. The documents 117 in the set of documents 117 may have been selected to use to generate labeled sequences (e.g., labeled short text sequences 131) to use to train a model 137 to determine the topic of a later received short text sequence 121. The received documents 117 may all be related by a similar domain, subject matter, industry, or entity. The subject matter of the documents 117 may be the subject matter that the model 137 will be trained to determine short text sequence topics from.

For example, an entity such as shoe retailer may wish to train a model 137 to determine the topic of received short text sequences 121 such as text messages received from their customers. Accordingly, the entity may select documents 117 related to shoes such as internal document, advertising or promotional documents, and technical documents. As will be described further below, these documents 117 may be used to generate labeled short text sequences 131 that can be used to train a shoe-specific model 137 for the entity. In another example, an entity such as a software company designing a chat bot to diagnose medical conditions may wish to train a model 137 to determine a medical condition of a user based on their messages with the chat bot. Accordingly, the entity may select documents 117 related to medicine such as journal articles, medical books, and other health-related materials.

The extraction module 115 may extract sentences 119 from the set of documents 117. Any method for parsing a document 117 to extract sentences 119 may be used. In some embodiments, the extraction module 115 may first parse each document 117 to remove or replace decimal characters so that they do not get confused with periods when extracting sentences 119.

The sequence module 120 may generate a plurality of sequences 121 from the sentences 119. A sequence 121, as used herein, may be a tuple that comprises some number of sequential sentences 119 from a document 117. For example, each tuple may include one, two, or three sentences from a document 117. Other sized tuples may be used, however when a tuple exceeds more than three sentences it may be too long to be considered a short text sequence 121. Therefore, the maximum size of a sequence 121 may be three.

Depending on the embodiment, the sequence module 120, from each document 117, may generate all possible sequences 121 of consecutive sentences from the document 117. In general, each sequence 121 may include consecutive sentences 119 from a single document 117.

In some embodiments, the sequence module 120 may eliminate noisy sentences 119 that do not have much content information before generating the sequences. Examples of such sentences 119 include "I did my bit" and "I played my part." These types of sentences 119 will not help determine the topic of a short text sequence if included in the training data. Depending on the embodiment, the sequence module 120 may determine the complexity of each sentence 119 and may remove any sentences 110 whose complexity falls below a threshold complexity. The complexity threshold may be zero. Other values may be used.

A suitable way to determine the complexity of a sentence includes the L2 syntactic complexity analyzer. The sequence module 120 may use the L2 analyzer to compute the number of complex nominals for each sentence 119. Those sentences 119 whose complex nominals fall below zero (or another threshold) may be discarded by the sequence module 120 and not used to generate any sequences 121.

The cluster module 125 may cluster or assign the sequences 121 into one or more more clusters 127. In some embodiments, the sequences 121 may be clustered by embedding the sequences into one or matrices. Each embedded sequence 121 may be a vector representation of the associated sequence 121. Any method for embedding a sequence 121 may be used such as ELMo, BERT, and Glove.

The cluster module 125 may cluster the vector representations of each short text sequence 121 into one or more clusters 127. A variety of well know clustering techniques may be used such as fuzzyc-means ("FCM") and gaussian mixture models ("GMM"). Other clustering methods may be used.

The label module 130 may label each of the sequences 121 based on the cluster(s) 127 that the vector representation of each sequence 121 belongs to. The label module 130 may first determine one or more topics for each cluster 127. In some embodiments, the label module 130 may determine the topics by first calculating, for each sequence 121, the probability that the sequence 121 (i.e., the vector representation of the sequence) belongs to each cluster 127. The label module 130 may then, for each cluster 127 select a subset of sequences 121 with the highest calculated probability for that cluster 127. The maximum (or minimum) number of sequences 121 in each subset may be specified by a user or administrator. In addition, the user or administrator may further specify a minimum or threshold probability for a sequence 121 to be included in a subset.

The label module 130 may, for each cluster 127, may use an ontology 140 to determine ontological entities corresponding to each of the sequences 121 in the subset of sequences 121 associated with the cluster 127. The ontology 140 may include ontologies such as DBPedia and may return one or more ontological entities for each sequence 121. The label module 130 may compare the ontological entities returned for each sequence 121 from the enology and may determine the topics 143 for the cluster 127 based on overlapping entities (i.e., entities returned for multiple sequences 121).

After determining the topics 143 corresponding to each cluster 127, the label module 130 may label each sequence 121 with the topics 143 of the clusters 127 of which its vector representation was a member. As described above, the label module 130 already calculated the probabilities that a sequence 121 belongs to each cluster. Accordingly, the label module 130 may label a sequence 121 with the topic 143 of the clusters 127 that it belongs to with a probability that is greater than a threshold probability. The threshold probability may be selected by a user or administrator. The label module 130 may output the sequences 121 and their associated labels as the labeled sequences 131.

The training module 135 may use the labeled sequences 131 to train a model 137 to determine the topics 143 associated with a received short text sequence 121. The labeled sequences 131 may be used as training data to train the model 137 according to one or more machine learning processes. Any method for training a model 137 using training data may be used.

Figure 2:
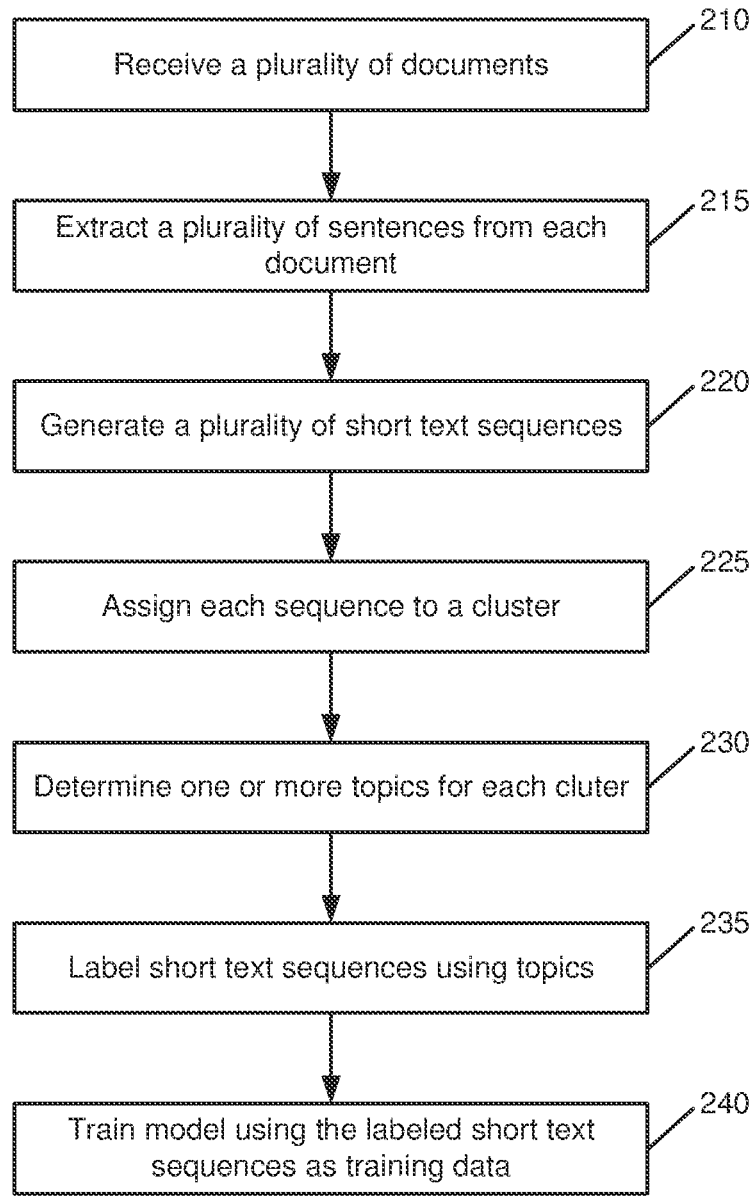
FIG. 2 is an illustration of a method for labeling short text sequences and for training a model using the labeled short text sequences.

FIG. 2 is an illustration of a method 200 for labeling short text sequences and for training a model using the labeled short text sequences. The method 200 may be performed by one or more modules of the computing device 110.

At 210, a plurality of documents is received. The plurality of documents 117 may be received by the extraction module 115. The documents 117 may include a variety of document types such as articles, publications, transcripts, websites, etc. The documents 117 in the set of documents 117 may be loosely related by subject matter or topic.

At 215, a plurality of sentences is extracted from each document 117. The sentences 119 may be extracted by the extraction module 115. Any method for extracting sentences 119 from documents 117 may be used.

In some embodiments, sentences 119 having a complexity that is below a threshold complexity may be discarded. Any method for measuring the complexity of a sentence 119 may be used.

At 220, a plurality of short text sequences is generated. The short text sequences 121 may be generated by the sequence module 120. Depending on the embodiment, each short text sequence 119 may be a tuple of either one, two, or three consecutive sentences 119 from a document 117. Other sized short text sequences 121 may be supported.

At 225, each short text sequence is assigned to a cluster. The short text sequences 121 may be assigned to clusters 127 by the cluster module 125. Any method for clustering may be used. In some embodiments, the short text sequences 121 may be clustered by first generating vector representations of the short text sequences 121 and then clustering based on the vector representations.

At 230, one or more topics are determined for each cluster. The one or more topics may be determined by the label module 130. In some embodiments, one or more sequences 121 may be sampled from each cluster 127 and provided to an ontology 140 to determine ontological entities associated with the sequences 121 in the ontology 140. The most frequent or common ontological entities determined for a cluster 127 may be determined as topics 143 for the cluster 127.

At 235, the short text sequences are labeled using the determined topics. The short text sequences 121 may be labeled by the label module 130 to become the labeled sequences 131. In some embodiments, the label module 130 may label a short text sequence 121 by determining clusters 127 that the sequence 121 is associated with and labeling the short text sequence 121 with the topics 143 associated with the determined clusters 127.

At 240, a model is trained using the labeled short text sequences. The model 137 may be trained using the labeled sequences 131 by the training module 135. The model 137 may be trained to receive a short text sequence 121 and to determine one or more topics 143 for the received short text sequence 121. The model 137 may be used in a call center to determine topics for short text sequences 121 such as SMS messages or chat messages that are received from customers. The determined topics may be used to select an agent 152 to handle or respond to the short text sequences 121.

Figure 3:
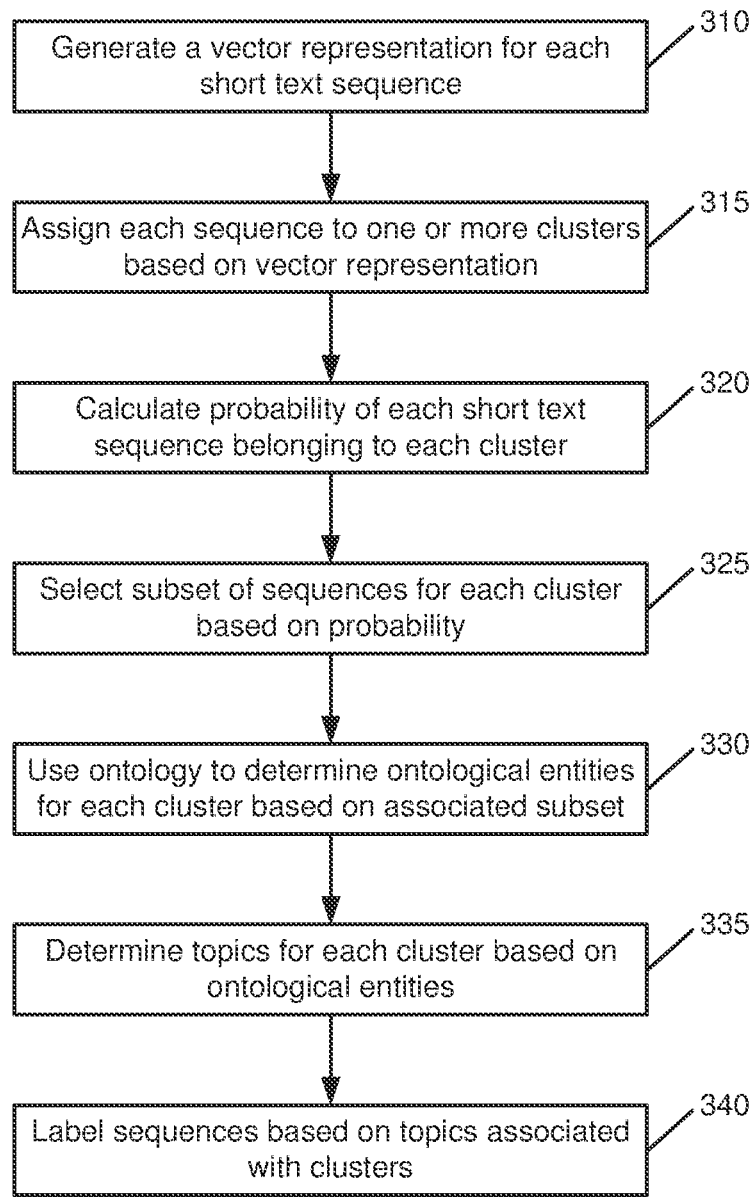
FIG. 3 is an illustration of a method for generating labeled sequences.

FIG. 3 is an illustration of a method 300 for generating labeled sequences. The method 300 may be performed by one or more modules of the computing device 110.

At 310, a vector representation of each short text sequence is generated. The vector representations may be generated by the cluster module 125. In some embodiments, the vector representation may be generated by embedding or encoding each of the sequences 121 into one or more matrices.

At 315, each sequence is assigned to one or more clusters based on vector representations. The sequences may be assigned to one or more more clusters 127 by the cluster module 125. Any method for clustering vectors may be used.

At 320, a probability of each short text sequence belonging to each cluster is calculated. Each probability may be calculated by the label module 130 based on how close the vector representation of a corresponding sequence 121 is to each of the clusters 127.

At 325, a subset of sequences is selected for each cluster based on the calculated probabilities. The subset of sequences 121 for each cluster 127 may be selected by the label module 130. In some embodiments, the subset selected for a cluster 127 may include the sequences 121 with the top calculated probabilities for that cluster 127. The number of sequences 121 in a subset may be set by a user or administrator.

At 330, an ontology is used to determine ontological entities for each cluster based on the short text sequences in the associated subset. The label module 130 may provide the ontology 140 each of the short text sequences 121 in the subset for a cluster 127 and may receive one or more ontological entities in response to each of the short text sequences 121 in the subset.

At 335, topics are determined for each cluster based on the determined ontological entities. The topics 143 may be determined by the label module 130. In some embodiments, the label module 130 may determine the top or most frequent ontological entities returned for the sequences 121 in the subset associated with the cluster 127. The label model 130 may then determine these ontological entities as the likely topics 143 for the cluster 127.

At 340, short text sequences are labeled based on the topics associated with the clusters. The short text sequences 119 are labeled by the label module 130 using the topics 143 associated with the clusters 127 that they belong to. The label module 130 may output the labeled sequences 121 as the labeled sequences 131.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for automatically generating labeled short text sequences from a document corpus without a human reviewer comprising:
   receiving a plurality of documents by a computing device;
   for each document of the plurality of documents, extracting a plurality of sentences from the document by the computing device;
   for each of the plurality of sentences, by the computing device:
      calculating a complexity for each sentence in the plurality of sentences, and
      removing sentences from the plurality of sentences with a calculated complexity that does not exceed a threshold;
   for each document of the plurality of documents, generating a plurality of short text sequences from the plurality of sentences extracted from the document by the computing device;
   assigning each of the plurality of short text sequences into one or more clusters of a plurality of clusters by the computing device;
   determining one or more topics for each cluster based on one or more of the short text sequences associated with the cluster by the computing device;
   for each short text sequence, labeling the short text sequence using the one or more topics determined for the one or more clusters of the plurality of clusters that the short text sequence is assigned to by the computing device; and
   training a model to classify short text sequence inputs using the plurality of labeled short text sequences by the computing device.

2. The method of claim 1, wherein assigning each of the plurality of short text sequences into one or more clusters of the plurality of clusters comprises:
   for each short text sequence, generating a vector representation of the short text sequence; and
   assigning each of the plurality of short text sequences into one or more clusters of the plurality of clusters based on the vector representations.

3. The method of claim 2, wherein determining one or more topics for each cluster based on the short text sequences associated with the cluster comprises:
   for each short text sequence, calculating the probability that the vector representation of the short text sequence belongs to each cluster;
   for each cluster, selecting a subset of the vector representations based on the calculated probabilities;
   for each cluster, using an ontology to determine ontological entities associated with the short text sequences corresponding to the vector representations in the selected subset of vector representations for the cluster by the computing device; and
   for each cluster, determining the one or more topics based on the determined ontological entities.

4. The method of claim 1, further comprising training a model using the labeled short text sequences.

5. The method of claim 1, wherein the threshold is zero.

6. The method of claim 1, wherein calculating the complexity for a sentence comprises calculating a number of complex nominals for the sentence.

7. The method of claim 1, wherein generating the plurality of short text sequences from the plurality of sentences extracted from the document comprises generating a short text sequence from each sentence of the plurality of sentences.

8. The method of claim 1, wherein generating the plurality of short text sequences from the plurality of sentences extracted from the document comprises generating a short text sequence from each pair of consecutive sentences of the plurality of sentences.

9. The method of claim 1, wherein generating the plurality of short text sequences from the plurality of sentences extracted from the document comprises generating a short text sequence from each triplet of consecutive sentences of the plurality of sentences.

10. A system for automatically generating labeled short text sequences from a document corpus without a human reviewer comprising:
 at least one computing device; and
 a computer-readable medium storing computer-executable instructions that when executed by the at least one computing device cause the at least one computing device to:
 for each document of the plurality of documents, extract a plurality of sentences from the document;
 for each of the plurality of sentences:
  calculate a complexity for each sentence in the plurality of sentences, and
  remove sentences from the plurality of sentences with a calculated complexity that does not exceed a threshold;
 for each document of the plurality of documents, generate a plurality of short text sequences from the plurality of sentences extracted from the document;
 assign each of the plurality of short text sequences into one or more clusters of a plurality of clusters;
 determine one or more topics for each cluster based on the short text sequences associated with the cluster;
 for each short text sequence, label the short text sequence using the one or more topics determined for the one or more clusters of the plurality of clusters that the short text sequence is assigned to; and
 train a model to classify short text sequence inputs using the plurality of labeled short text sequences.

11. The system of claim 10, wherein assigning each of the plurality of short text sequences into one or more clusters of the plurality of clusters comprises:
 for each short text sequence, generating a vector representation of the short text sequence; and
 assigning each of the plurality of short text sequences into one or more clusters of the plurality of clusters based on the vector representations.

12. The system of claim 11, wherein determining one or more topics for each cluster based on the short text sequences associated with the cluster comprises:

for each short text sequence, calculating the probability that the vector representation of the short text sequence belongs to each cluster;
 for each cluster, selecting a subset of the vector representations based on the calculated probabilities;
 for each cluster, using an ontology to determine ontological entities associated with the short text sequences corresponding to the vector representations in the selected subset of vector representations for the cluster; and
 for each cluster, determining the one or more topics based on the determined ontological entities.

13. The system of claim 10, wherein the threshold is zero.

14. The system of claim 10, wherein calculating the complexity for a sentence comprises calculating a number of complex nominals for the sentence.

15. The system of claim 10, wherein generating the plurality of short text sequences from the plurality of sentences extracted from the document comprises generating a short text sequence from each sentence of the plurality of sentences.

16. The system of claim 10, wherein generating the plurality of short text sequences from the plurality of sentences extracted from the document comprises generating a short text sequence from each pair of consecutive sentences of the plurality of sentences.

17. A non-transitory computer-readable medium with instructions stored thereon that when executed by a processor cause the processor to:
 for each document of the plurality of documents, extract a plurality of sentences from the document;
 for each document of the plurality of documents, generate a plurality of short text sequences from the plurality of sentences extracted from the document;
 for each of the plurality of sentences:
  calculate a complexity for each sentence in the plurality of sentences, and
  remove sentences from the plurality of sentences with a calculated complexity that does not exceed a threshold;
 assign each of the plurality of short text sequences into one or more clusters of a plurality of clusters;
 determine one or more topics for each cluster based on the short text sequences associated with the cluster;
 for each short text sequence, label the short text sequence using the one or more topics determined for the one or more clusters of the plurality of clusters that the short text sequence is assigned to; and
 train a model to classify short text sequence inputs using the plurality of labeled short text sequences.

* * * * *